(12) United States Patent
Mackin et al.

(10) Patent No.: US 8,205,899 B2
(45) Date of Patent: Jun. 26, 2012

(54) EXTENDIBLE AXLE MEMBER FOR THE REAR OF AN AGRICULTURAL HARVESTER

(75) Inventors: Ryan Patrick Mackin, Milan, IL (US); Daniel James Burke, Cordova, IL (US); Bruce Alan Coers, Hillsdale, IL (US); Eric Allen Risius, Hampton, IL (US)

(73) Assignee: Deere & Company, Moline, IL (US)

( * ) Notice: Subject to any disclaimer, the term of this patent is extended or adjusted under 35 U.S.C. 154(b) by 129 days.

(21) Appl. No.: 12/774,409

(22) Filed: May 5, 2010

(65) Prior Publication Data

US 2011/0272905 A1 Nov. 10, 2011

(51) Int. Cl.
*B60G 9/02* (2006.01)
*B60B 35/10* (2006.01)

(52) U.S. Cl. ............ 280/124.11; 301/128; 280/124.111; 180/209

(58) Field of Classification Search ............... 180/24.01, 180/24.02, 24.03, 209; 280/124.11, 124.111; 301/124.1, 128, 131, 132
See application file for complete search history.

(56) References Cited

U.S. PATENT DOCUMENTS

| | | | | |
|---|---|---|---|---|
| 1,653,114 A | * | 12/1927 | Marcum | 301/132 |
| 4,040,643 A | * | 8/1977 | Applequist et al. | 280/656 |
| 4,449,600 A | * | 5/1984 | Telfer | 180/437 |
| 5,121,808 A | * | 6/1992 | Visentini et al. | 180/435 |
| 5,464,243 A | * | 11/1995 | Maiwald et al. | 280/638 |
| 5,664,847 A | * | 9/1997 | Bear et al. | 301/137 |
| 6,994,405 B2 | * | 2/2006 | Li et al. | 301/124.1 |
| 7,278,648 B2 | * | 10/2007 | Bobbitt et al. | 280/86.751 |
| 2004/0130114 A1 | * | 7/2004 | Weichholdt | 280/86.751 |
| 2009/0103842 A1 | * | 4/2009 | Vannorsdel et al. | 384/151 |

FOREIGN PATENT DOCUMENTS

| | | |
|---|---|---|
| DE | 869308 | 11/1953 |
| DE | 1555320 | 5/1966 |
| DE | 10034580 | 7/2000 |
| EP | 2168786 | 3/2010 |
| GB | 2082986 | 3/1982 |

OTHER PUBLICATIONS

European Search Report, Aug. 26, 2011, 7 pgs.

* cited by examiner

*Primary Examiner* — Joseph Rocca (57) ABSTRACT

An extendible axle member (146 or 148) is provided for a pivoting axle of an agricultural harvester (100), the extendible axle member (146 or 148) having an elongate telescopic portion (400) with bearing surfaces for being slidably received in an outer axle member (142 or 144), wherein the elongate telescopic portion (400) is formed integral with and abuts a C-frame for supporting a steering knuckle (158 or 160).

12 Claims, 6 Drawing Sheets

EXTENDIBLE AXLE MEMBER FOR THE REAR OF AN AGRICULTURAL HARVESTER

FIELD OF THE INVENTION

The invention concerns an extendible axle member for the rear of an agricultural harvester.

BACKGROUND OF THE INVENTION

Agricultural combines are heavy large machines that harvest, thresh, separate and clean harvested crop, planted agriculturally that carries corn. They include steerable rear wheels mounted on the free ends of rear axles that pivot about a central longitudinal axis.

The axles are telescopic and can be varied in length by stopping the vehicle, loosening clamps and forcing the extendible axle member in (or out) of an outer axle member until a desired axle length is achieved, then tightening short axle clamps to lock the extensible axle member and the outer axle member in that position.

In new harvesters, it has been proposed to permit the extendible axle of the combine to slide in and out of the outer axle while the vehicle is being driven through a field. Hydraulic actuators have been considered for use to extend the axles during operation. In this arrangement the extendible axle member and outer axle member may be provided with a releasable clamp that can be opened when the axles are telescoped and then reapplied when the axle has the desired length.

Axles that can be extended and retracted while the agricultural combine is under way performing its harvesting functions will require improved axles with tighter tolerances. In addition, other activities typically performed by the operator when manually extending and retracting the axle will have to be performed automatically or eliminated.

One such function is insuring that the inner telescopic axle member is clean before retracting it into the outer telescopic axle member to prevent jamming, corrosion, or undue wear.

U.S. Pat. No. 5,121,808 shows a telescoping steering axle with a non driven (gauge) wheel supported on an inner axle member. The inner axle slides loosely into the outer axle and is clamped against one side of the outer axle by bolts that pass through the inner and outer axle. The bolts are located at the outer end of the outer tube and the inner tube is unsupported. See the cutaway in FIG. 1.

U.S. Pat. No. 5,464,243 shows an extendible axle for a self-propelled sprayer having an outer axle and an inner axle. A clamping arrangement in the form of a V-shaped wedge with plastic shims on top is provided at the bottom of the outer end of the outer tube. The inner end of the inner axle tube is unsupported. Bolts in the bottom of the outer tube are provided to abut the wedge and force it up against the inner tube, lifting the inner tube and wedging in against a plastic shim at the top of the outer tube. The bolts are tightened to lock the inner tube in position with the new preferred row spacing U.S. Pat. No. 5,489,114 shows a telescopic axle assembly for an aerial work platform having wheels that are telescopically extended to increase the wheelbase and make the vehicle more stable when the vehicle is stopped and the aerial work platform is being used. The axle is constructed of three nested telescopic member, a central hollow square tubular member fixed to the chassis and two hollow square tubular members in which each of the three members is telescoped inside the other. Bearing strips of undetermined shape are located between the top and side walls of the three members to facilitate the extension and contraction of the tubular members.

PURPOSE OF THE INVENTION

The purpose underlying the invention herein is seen in the need to provide an improved rear axle that maintains the tolerance, reduces wear and is more resistant to torsional loads applied to the axle while it is underway without the need for a manual clamp to hold the telescopic axle members in a fixed position. This capability is provided by the novel geometry of the extendible rear axle described herein.

SUMMARY OF THE INVENTION

The problem is solved according to the invention by the teaching of patent claim 1, where the further patent claims cite characteristics that further develop the solution to great advantage.

In accordance with a first aspect of the invention, an extendible axle member is provided for an agricultural harvester, the harvester having a chassis supported on two driven front wheels and two driven and steerable rear wheels, the rear wheels being supported on a rear axle assembly that includes a central axle member supported to pivot about a horizontal and longitudinally extending axis, the central axle member including left side and right side outer axle members, the extendible axle member including an elongate telescopic portion having a longitudinal axis parallel to the longitudinal extent of the elongate telescopic portion, the elongate telescopic portion further having a plurality of bearing surfaces, the elongate portion having a first end and a second end, wherein the first end is configured to be slidably received inside a first open end of the left or right side outer axle member and to be telescopically supported on bearing surfaces disposed inside the left or right side outer axle member; and a C-frame, comprising a vertical member to which the elongate telescopic portion is fixed, the vertical member having an upper end and a bottom end, a first horizontal member fixed to and extending horizontally from the upper end, and a second horizontal member fixed to and extending horizontally from the bottom end, the two horizontal members defining upper and lower steering knuckle mounts, wherein the C-frame and the elongate telescopic portion are formed integral with each other and abut each other.

The plurality of bearing surfaces may be disposed in a rectangular or trapezoidal pattern, and the plurality of bearing surfaces comprise four elongate bearing surfaces extending parallel to the longitudinal axis. The plurality of bearing surfaces may be planar and may include two upper and two lower bearing surfaces, with the two upper bearing surfaces facing upward and outward away from each other, and the two lower bearing surfaces facing downward and outward away from each other. The elongate telescopic portion may be in the form of a hollow tube having an open outer end with the outer end enclosed by the vertical member. The vertical member may be disposed generally perpendicular to the longitudinal extent of the elongate telescopic portion. At least a portion of the vertical member may be higher than a topmost portion of the elongate telescopic portion when the elongate telescopic portion is in its operating position. At least a portion of the vertical member is lower than the bottommost portion of the elongate telescopic portion when the elongate telescopic portion is in its operating position. At least a portion of the vertical member may be disposed directly above the outer axle member when the elongate telescopic portion is received in the outer axle member. Every one of the four bearing surfaces may be disposed at either a 90 degree angle or a 180 degree angle with respect to all the other bearing surfaces. The vertical member may abut the plurality of bearing surfaces. The first and second horizontal members may extend from the vertical member on a side of the vertical member opposite the side of the vertical member from which the elongate telescopic portion extends. Two of the plurality of bearing surfaces may be disposed forward of a steering axis defined by the steering knuckle mounts and two others of the plurality of bearing surfaces may be disposed behind the steering axis.

BRIEF DESCRIPTION OF THE DRAWINGS

Embodiments of the several inventions identified above are explained on the basis of the FIGURES, in which.

DETAILED DESCRIPTION OF THE PREFERRED EMBODIMENTS

In the discussion below, "forward", "front", "in front of" or like words refer to the forward direction of travel of the agricultural combine, which is parallel to the longitudinal axis of the agricultural combine, and also parallel to the pivoting axis of the rear axle. In the discussion below, "rearward", "rear", "behind", and like words refer to the direction opposite to the forward direction of travel of the agricultural combine.

In the discussion below, the description of features or structures of the right side of the rear axle assembly is identical for the left side of the rear axle assembly, and the novelties noted and/or claimed with regard to the right side of the rear axle assembly are equally as novel for the left side. Only the right side is described in detail below for convenience. The comments made regarding the right side are equally applicable to the left side, but in mirror relation. The rear suspension is mirror symmetrical about a vertical plane that contains the pivoting axis of the rear axle assembly.

Figure 1:
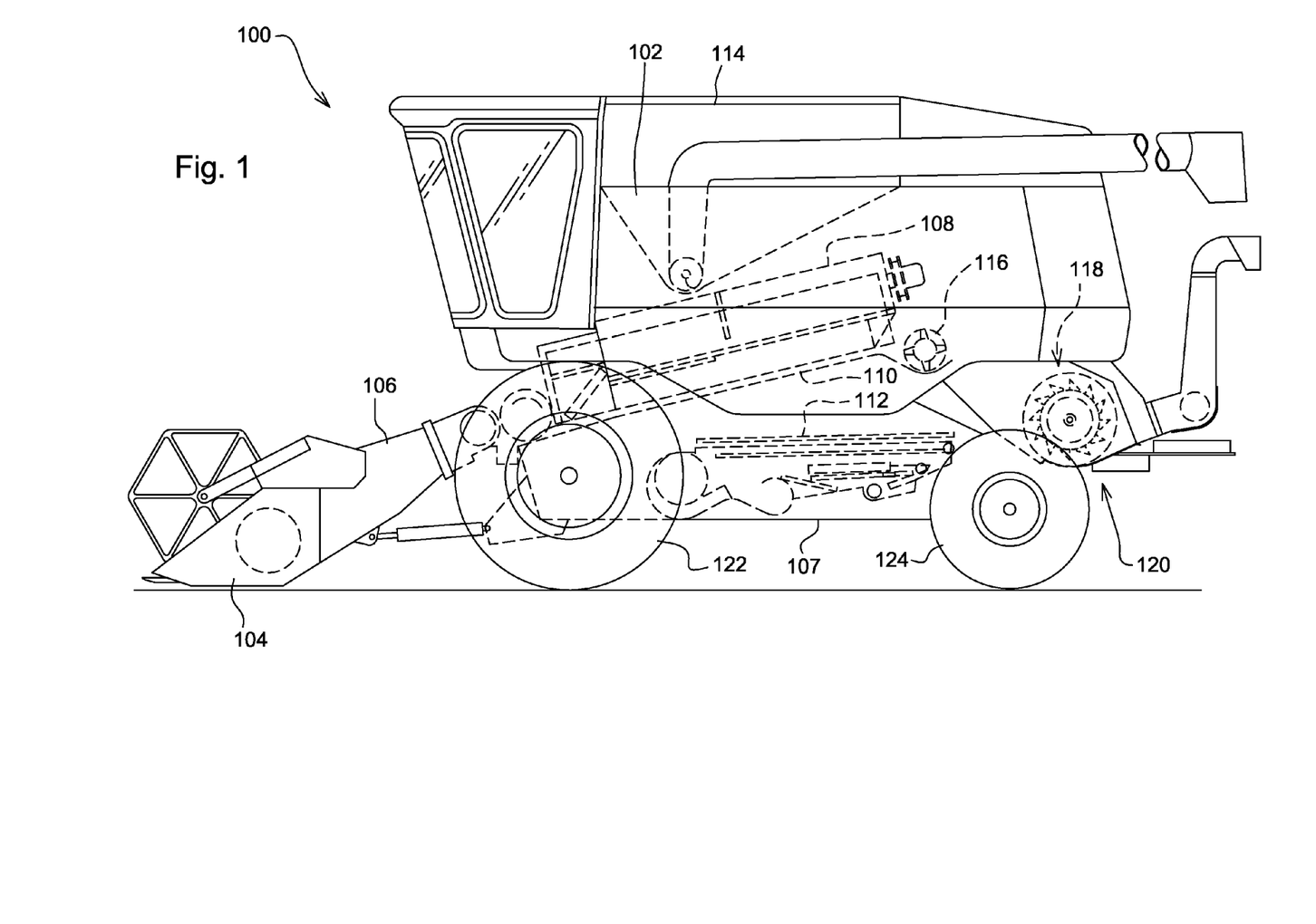
FIG. 1 shows a partial phantom left side view of an agricultural harvester in accordance with this invention.

FIG. 1 illustrates an agricultural harvester 100 in accordance with the present invention. The harvester comprises a harvester vehicle 102 having a harvesting head 104 supported on a feederhouse 106 that is mounted on the front of harvester vehicle 102 on the vehicle chassis 107. A longitudinally extending rotor 108 is disposed to rotate within a concave 110 to separate crop material (i.e. grain) from crop residue.

An oscillating cleaning shoe 112 is supported underneath the concave to receive crop material. The crop material is cleaned in the cleaning shoe and is carried upward into a grain tank 114. Crop residue leaving the rear end of rotor 108 is directed into a beater 116 which separates some residual crop material from the crop residue and directs that residual crop material into the cleaning shoe 112. Crop residue exiting the beater 116 is directed rearward into an inlet 118 of chopper 120. Similarly, crop residue separated from the material in the cleaning shoe 112 is also directed into chopper 120. The crop residue exiting beater 116 typically includes cornstalks. The crop residue exiting the cleaning shoe typically includes chaff and other light crop residue.

Identically arranged left and right front wheels 122 (only the left is shown) are coupled to the chassis 107 to support the front of the harvester on the ground. They are driven in rotation by hydraulic drive motors to propel the harvester. Identically arranged left and right rear drive wheels 124 are coupled to the chassis 107 to support the rear of the harvester on the ground.

Figure 2:
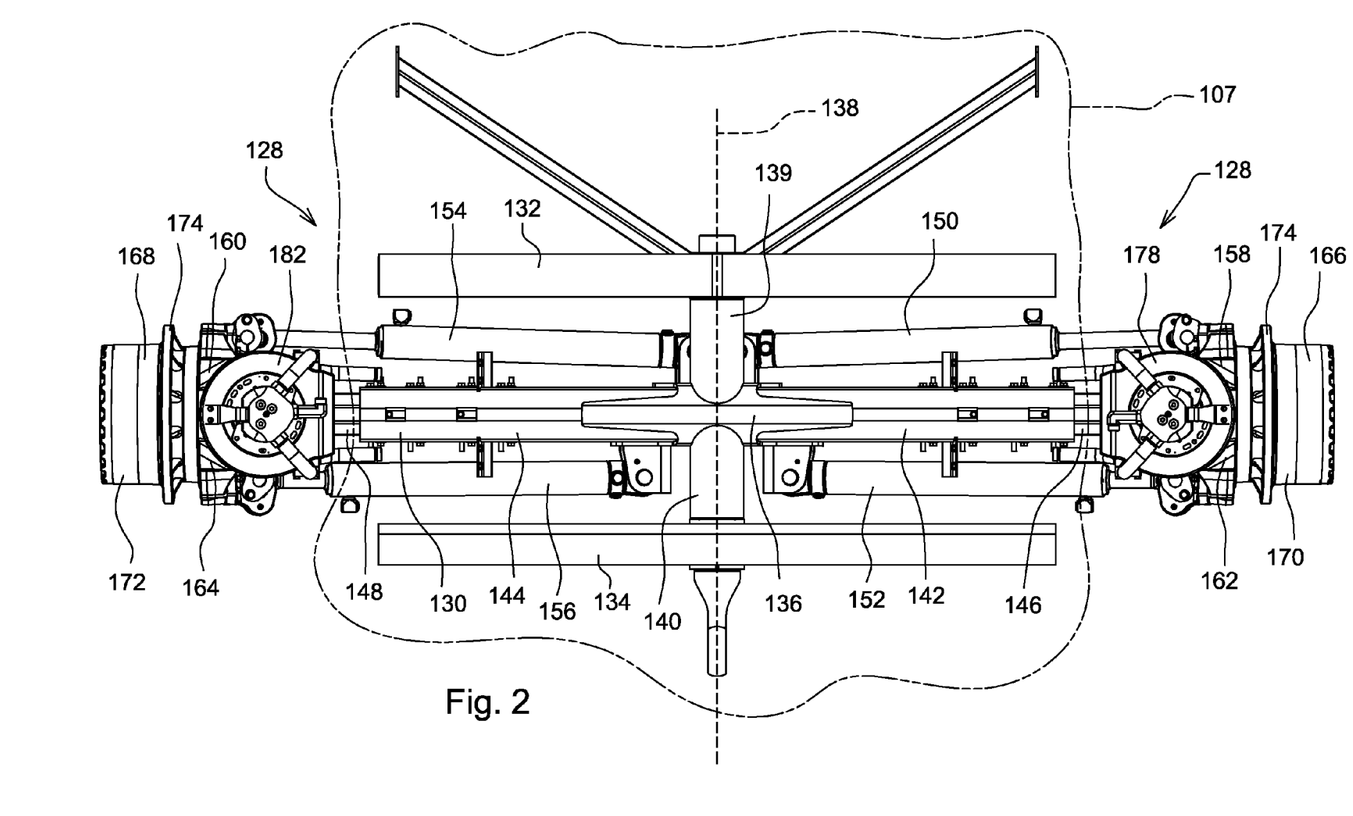
FIG. 2 is a fragmentary top view of the rear suspension of the harvester of FIG. 1.
Figure 3:
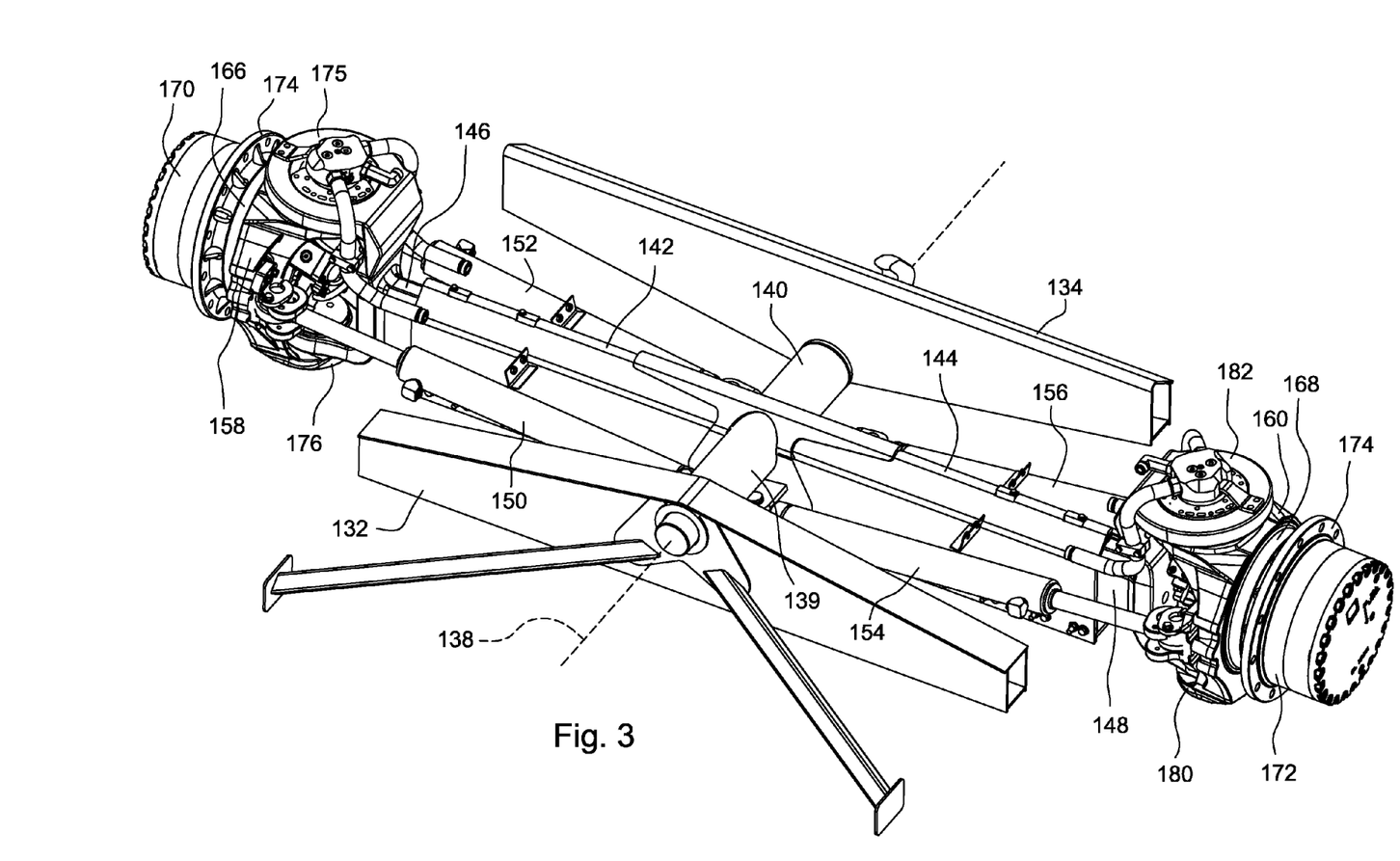
FIG. 3 is a perspective top view of the rear suspension of the harvester of FIGS. 1-2.

Referring to FIGS. 2 and 3, the chassis 107 is supported on a rear axle assembly 128 that includes a steerable rear axle 130 supported on front and rear axle mounts 132, 134. Front and rear axle mounts 132, 134 are fixed to the bottom of the chassis 107 and support central axle member 136 for pivoting about longitudinal pivot axis 138.

The central axle member 136 is in the form of a cross, with a forwardly extending tubular coupling 139 supported for pivoting in front axle mount 132 and a rearwardly extending tubular coupling 140 supported for pivoting in rear axle mount 134. Central axle member 136 also comprises right and left outer axle members 142, 144 that are fixed rigidly to, and extend to the right and to the left from, the couplings 139, 140 to form the rigid elongate central axle member on 36.

The rear axle assembly 128 is symmetric about a vertical plane that passes longitudinally through the agricultural harvester and in particular through the longitudinal pivot axis 138. Henceforth, any discussion of one side of the rear axle assembly is true for the other side as well.

Rear axle assembly 128 further includes right and left extendible axle members 146, 148 that are slidably supported in right and left outer axle members 142, 144, respectively, to be slid in and out by hydraulic actuators 150, 152 here shown as hydraulic cylinders (on the right side) and hydraulic actuators 154, 156, here shown as hydraulic cylinders (on the left side).

The hydraulic actuators are disposed on each side of the outer axle members and are coupled at their inner ends to their respective outer axle member and at their outer ends to right and left and left steering knuckles 158, 160 that in turn are pivotally mounted to steering knuckle mounts on the outer ends of the extendible axle members. By this arrangement, the extendible axle members can be extended from or retracted into the outer axle members by extending or retracting the hydraulic cylinders. Further, the steering knuckles are pivotally coupled to the ends of the extendible axle members and can be steered to the left or right by extending one of the hydraulic actuators more or less than the other of the hydraulic actuators.

The right and left steering knuckles 158, 160 support right and left hydraulic motors 162, 164 on lower and upper, right and left steering knuckle mounts 176, 178, 180, 182 that are coupled to and drive right and left planetary gearboxes 166, 168. Right and left output shafts from the planetary gearboxes drive right and left wheel hubs 170, 172, in rotation. Each of the wheel hubs has a flange 174 to which the rear wheels are attached. Thus the hydraulic motors drive the wheels in rotation. Since they are mounted to the steering knuckles, the motors and the wheels can be extended or steered to the right and to the left by selectively extending and retracting the hydraulic actuators.

Figure 4:
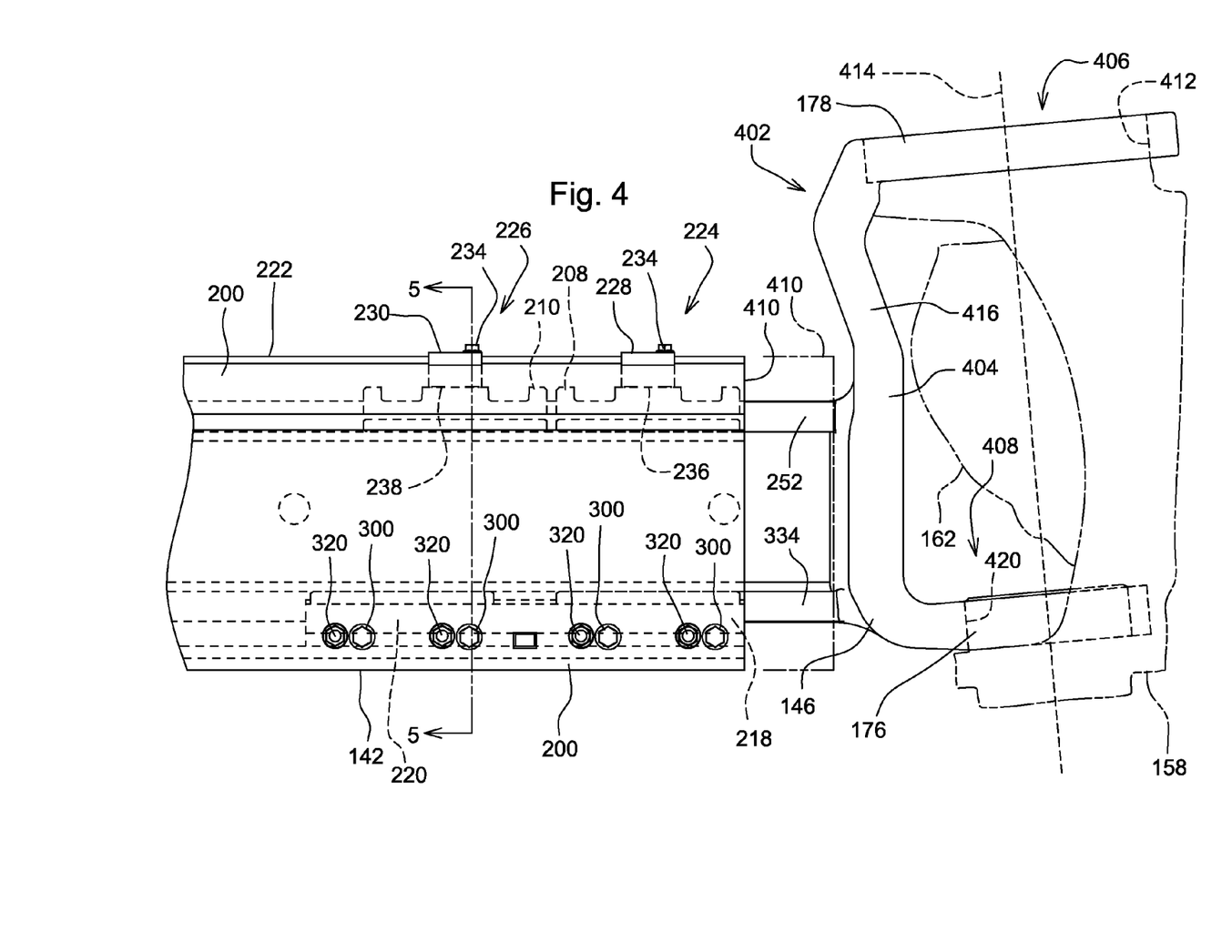
FIG. 4 is a fragmentary rear view of the right side extendible axle member and outer axle member of FIGS. 2-3.
Figure 5:
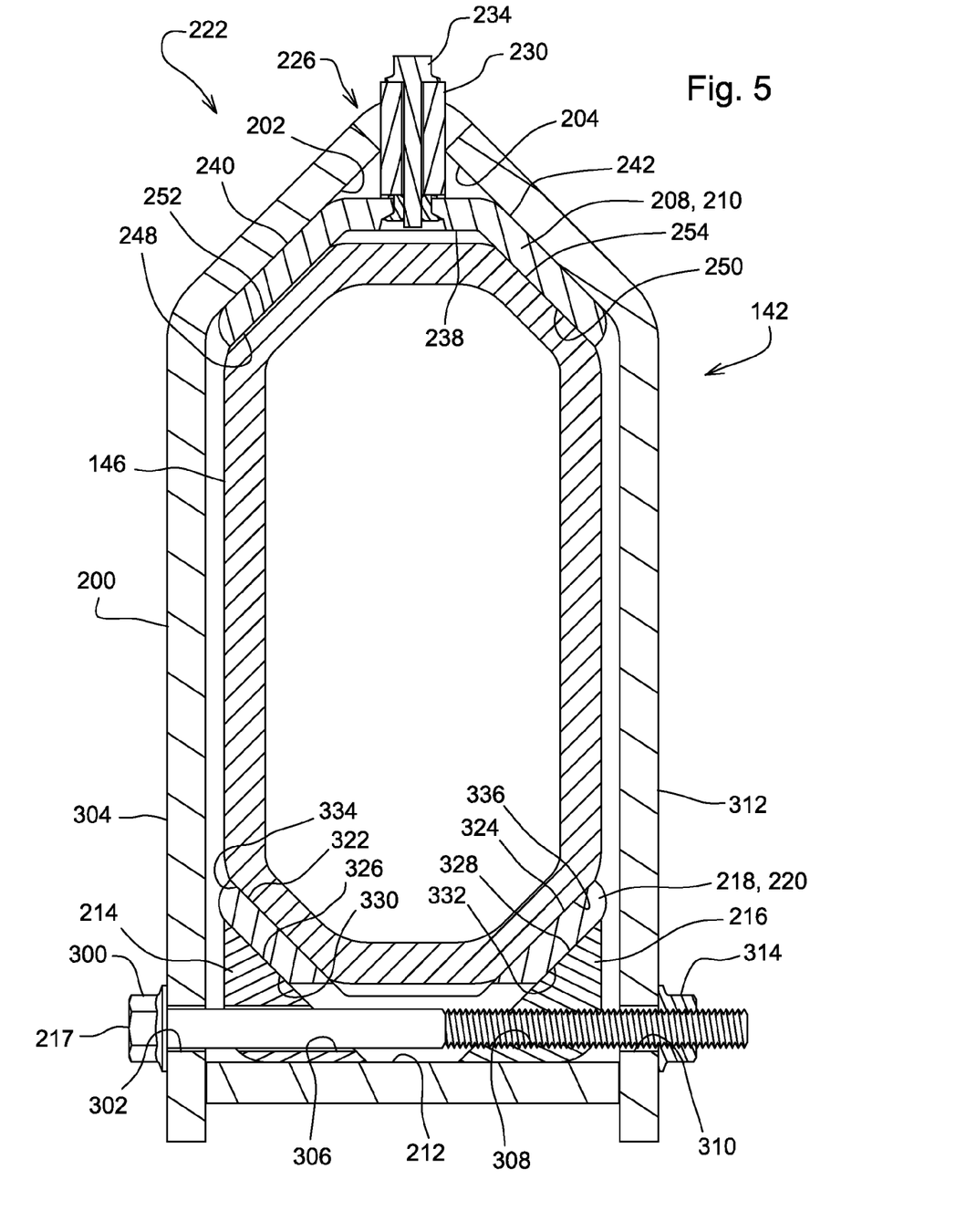
FIG. 5 is a cross-sectional view of the right side extendible axle member and outer axle member of FIG. 4 taken at section line 5-5 in FIG. 4.

Referring to FIGS. 4 and 5, the right outer axle member 142 is comprised of an elongate tubular structure 200 having a constant cross sectional profile over its length that supports the right extendible axle member 146 over substantially the entire length of the right extendible axle member when the right extendible axle member is inserted completely into the outer axle member. Inside planar top surfaces 202, 204 support V-shaped planar bearings 208, 210. Planar bottom surface 212 supports two elongate triangular adjustment members 214, 216, which in turn support V-shaped bearings 218, 220.

Elongate tubular structure 200 has a peaked top surface 222. This peaked arrangement helps prevent plant matter from collecting on top of the axle. By keeping the top of elongate tubular structure 200 clean, less material falls long to the exposed upper surface of extendable axle member 146, and therefore less material contaminates the sliding bearing surfaces of V-shaped planar bearings 208, 210.

Spaced apart rectangular slots 224, 226 are configured to receive guide members 228, 230 that are fixed to the top of V-shaped planar bearings 208, 210. Removable fasteners 232, 234 fix guide members 228, 230 to a central web 236, 238 of V-shaped planar bearings 208, 210 to extend upwardly therefrom.

The outer and upper surfaces 240, 242 of V-shaped planar bearings 208, 210 abut the inside top surfaces 202, 204 of elongate tubular structure 200. Inside top surfaces 202, 204 are disposed at a 90° angle to each other. Upper surfaces 240, 242 are disposed at a 90° angle to each other and are coplanar with inside top surfaces 202, 204, respectively.

The inner surfaces 248, 250 of each of V-shaped planar bearings 208, 210 are planar and are disposed at a 90° angle to each other. They are also parallel to and spaced equidistantly from outer and upper surfaces 240, 242, respectively.

Inner surfaces 248, 250 are configured to slidingly engage two upper and outer surfaces 252, 254 of right side extendable axle member 146. Upper and outer surfaces 252, 254 are also disposed at a 90° angle to each other.

V-shaped bearings 208, 210 are held in place with respect to elongate tubular structure 200 by guide members 228, 230. When right extendable axle member 146 is extended and retracted with respect to elongate tubular structure 200 by hydraulic cylinders 150, 152, surfaces 252, 254 function as bearings and slide against inner surfaces 248, 250.

V-shaped bearings 208, 210 are disposed one behind the other longitudinally along the inside length of elongate tubular structure 200. In the preferred arrangement illustrated here, two V-shaped bearings 208, 210 are provided to support right extendable axle member 146 within elongate tubular structure 200. In an alternative arrangement, more V-shaped bearings could be provided to support the extendable axle member 146 over greater length when the extendable axle member 146 is completely retracted within elongate tubular member 200.

The two elongate triangular adjustment members 214, 216 are disposed inside and rest upon the planar bottom surface 212 of elongate tubular structure 200. They are not fixed to the planar bottom surface 212, but can be translated in a direction perpendicular to the longitudinal extent of elongate tubular member 200, toward and away from the lower portion of extendable axle member 146.

For each V-shaped bearing, two first bolts 300 extend through a clearance aperture 302 in a first lower sidewall 304 of elongate tubular structure 200. Bolts 300 extend through a second clearance aperture 306 in elongate triangular adjustment member 214. Bolts 300 are then threadedly engaged in a threaded aperture 308 in the elongate triangular adjustment member 216. The threaded free end portions of bolts 300 extend completely through a third clearance aperture 310 in a second lower sidewall 312 of elongate tubular structure 200. Lock nuts 314 are threadedly engaged to the portion of bolts 300 that extends completely through elongate tubular structure 200, and are locked against the outer surface of second lower sidewall 312 to prevent bolts 300 from rotating with respect to elongate tubular structure 200.

In this arrangement, bolts 300 are under tension and hold elongate triangular adjustment member 216 against an outer lower surface of V-shaped bearings 218, 220. When agricultural harvester 100 is driven through the field, an outward force is applied by extendable axle member 146 to V-shaped bearings 218, 220, which is further communicated to elongate triangular adjustment members 214, 216, attempting to drive them apart (i.e. to drive member 214 to the left, and to drive member 216 to the right in FIG. 5). The rightward force applied to elongate triangular adjustment member 216 is resisted by bolts 300, which are placed in tension by this rightward force. This rightward force is communicated through the threads of the adjustment member 216 into the threads of the bolts 300, and up the shaft of the bolts, where rightward movement is resisted by the heads 217 of bolts 300.

In a prior art arrangement, movement of adjustment members away from a sliding axle member is provided by studs that are threaded engaged to the relatively thin sidewall of elongate tubular structure 200. This tends to strip the threads of the studs and the sidewall of the outer axle member.

Bolts 320 are identically arranged as bolts 300, and provide the identical function as bolts 300, by extending in the opposite direction as bolts 300 through a clearance hole in lower sidewall 312, through another clearance hole in elongate triangular adjustment member 216, and are threadedly engaged to elongate triangular adjustment member 214 in an identical fashion, but in a mirror image arrangement. Bolts 320 by their threaded engagement with elongate triangular adjustment member 214, resist outward forces against member 214, and communicate those tensile forces to the heads of bolts 320.

Elongate triangular adjustment members 214, 216 are provided to eliminate slack between the extendable axle member 146 and elongate tubular structure 200. As the bearing surfaces 322, 324 provided on the V-shaped bearings 218, 220 begin to wear, slack is produced. This slack is eliminated by loosening the lock nuts on bolts 300, 320, then tightening bolts 300, 320. Tightening the bolts draws elongate triangular adjustment members 214, 216 inwardly toward each other in a horizontal direction across the planar bottom surface 212 of elongate tubular structure 200.

Elongate triangular adjustment members 214, 216 have two bearing support surfaces 326, 328 that bear against bearing surfaces 330, 332. As bearing support surfaces 326, 328 are drawn together in this adjustment process, they slide inward against bearing surfaces 330, 332 from opposite sides and in opposite directions thereby forcing V-shaped bearings 218, 220 straight upward (assuming members 214, 216 are adjusted the same distance), eliminating the slack, and moving sliding bearing surfaces 322, 324 upward against the lower bearing surfaces 334, 336 of extendable axle member 146. When bolts 300, 320 are tightened an equal amount, the effect is to lift extendable axle member 146 straight upward, without bringing it closer to one side or the other of elongate tubular structure 200. It retains its fore-and-aft position in the axle assembly. This beneficially maintains the steerable rear axle dynamics and its caster and camber angles.

V-shaped bearings 218, 220 therefore slide in the longitudinal direction (the front to rear direction) with respect to their supporting members (members 214, 216) while translating vertically with respect to the axle housing (structure 200). V-shaped bearings 218, 220 are pinched from both sides between members 214, 216 when the gap between members 214, 216 is narrowed and are thereby forced upward, reducing the slack.

Surfaces 322, 324 are at a 90° angle with respect to each other and are each at 45° with respect to vertical. Surfaces 326, 328 are at a 90° angle with respect to each other, and are each at 45° with respect to vertical. Surfaces 330, 332 are at a 90° angle with respect to each other, and are each at 45° with respect to vertical. Surfaces 334, 336 are at a 90° angle with respect to each other, and are each at 45° with respect to vertical. Surfaces 322, 326, 330 and 334 are planar and parallel to each other. Surfaces 324, 328, 332, and 336 are planar and parallel to each other.

Figure 6:
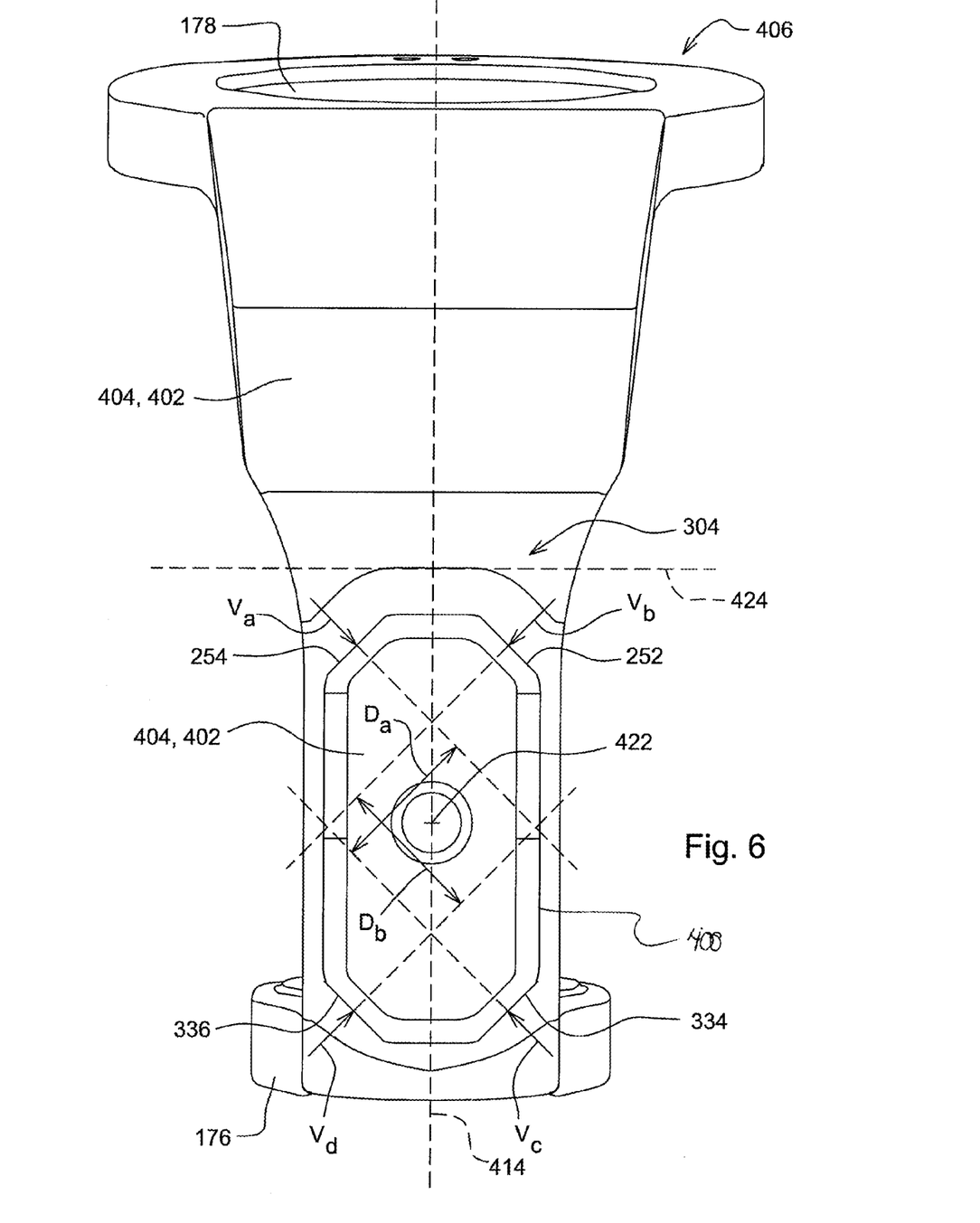
FIG. 6 is a left side view of the right side extendible axle member of the foregoing FIGURES.

Referring now to FIG. 6, the extendible axle member 146 is formed of an elongate portion 400 that is fixed to and formed integral with a C-frame 402, which is in turn comprised of a vertical member 404 to which an upper horizontal member 406 is fixed and to which a lower horizontal member 408 is fixed.

Elongate telescopic portion 400 is formed integral with or is fixed permanently to C-frame 402. The former is preferably achieved by simultaneously casting or forging the C-frame 402 and the elongate telescopic portion 400. The latter is preferably achieved by welding C-frame 402 to elongate telescopic portion 400.

Elongate telescopic portion 400 has bearing surfaces 252, 254, 334, 336, each disposed at a 45° angle with respect to vertical. Bearing surfaces 252, 254, 334, 336 form beveled corners of elongate telescopic portion 400. The surfaces are planar and extend substantially the entire length of elongate telescopic portion 400.

Elongate telescopic portion 400 is configured to be received completely within elongate tubular structure 200 such that it is supported solely upon bearing surfaces 248, 250, 322, and 324 of V-shaped bearings 208, 210, 218, and 220. Bearing surfaces 248, 250, 322, and 324 are disposed at four corners of elongate tubular structure 200 and support the elongate telescopic portion 400 at four corners. The four bearing surfaces 248, 250, 322, and 324 support elongate telescopic portion 400 within elongate tubular structure 200 such that the bottom wall and sidewalls of elongate tubular structure 200 would do not contact elongate telescopic portion 400. Similarly, the bottom wall, top wall, and sidewalls of elongate telescopic portion 400 do not contact elongate tubular structure 200.

Vertical member 404 is larger in side view (i.e. as viewed in FIG. 6: in a direction parallel to the longitudinal extent of elongate telescopic portion 400) than the elongate telescopic portion 400. Vertical member 404 cannot therefore be received in the open outer end 410 of tubular structure 200. The robust way in which elongate tubular structure 200 is constructed together with the V-shaped bearings 208, 210, 218, 220 permits a very compact telescopic portion—compact in both the vertical and horizontal directions—that permits the axle itself to be made light weight and smaller, such that the C-frame 402 extends forward of the forwardmost portion of elongate telescopic portion 400, the C-frame 402 extends behind the rearmost portion of elongate telescopic portion 400, the C-frame 402 extends above the uppermost portion of elongate telescopic portion 400, and the C-frame 402 extends below the lowermost portion of elongate telescopic portion 400.

Upper horizontal member 406 has a steering knuckle mount 178. Lower horizontal member 408 has a steering knuckle mount 176. Steering knuckle mount 178 is defined by a first aperture 412 that defines a generally vertical steering axis 414. Steering knuckle mount 176 is defined by a second aperture 420 having a smaller diameter than the diameter of first aperture 412. Axis 414 passes through and is defined by the center of second aperture 420.

Axis 414 is oriented generally vertically and preferably slightly away from vertical to provide a suitable caster angle and camber angle for the right rear wheel.

In order to locate the steering knuckle as closely as possible to the side of the combine, vertical member 404 is provided with a bend 416 that permits an upper portion of vertical member 404 to extend over the top of outer end 410 of tubular structure 200. The position 418 of outer end 410 when elongate portion 400 is completely retracted into elongate tubular structure 200 is shown in dashed lines in FIG. 4. To permit the upper steering knuckle to extend over the top of outer end 410, the elongate portion 400 is fixed asymmetrically to vertical member 404, such that the center of area 422 (FIG. 6) of the elongate telescopic portion 400 is disposed below the vertical midline 424 of the vertical member 404. As shown in FIG. 4, elongate telescopic portion 400 is fixed to the bottom half of vertical member 404 completely below the vertical midline 424 of the vertical member 404.

This arrangement provides a housing for the motor 162, the housing being defined by the C-frame 402 and steering knuckle 158 which substantially enclose hydraulic motor 162.

The elongate telescopic portion 400 is rectangular, not square. It is greater in its vertical extent (height) than in its horizontal extent (width). Since the shape is not square, it offsets diagonally disposed bearing surface 254, 334 and diagonally disposed bearing surface pair 252, 336. When these surfaces are disposed at the corners of an elongate telescopic portion 400 having an alternative square cross section, they directly oppose each other on opposite sides of the square cross section.

Each of the two diagonally offset pair of bearings 254, 334, and 252, 336 have surfaces that are opposed to each other: the surfaces lie in parallel planes, facing in opposite directions, i.e. facing in 180 degree opposed directions. When the motor 162 drives the wheel on the end of extendable axle portion 146 in rotation, one pair of diagonally opposed bearing surfaces 254, 334 resists motor-induced rotation in one direction, and the other pair of diagonally opposed bearing surfaces 252, 336 resists motor-induced rotation in the other direction. The forces applied to each bearing surface are normal to that bearing surface. They are distributed evenly across the entire bearing surface, and therefore can be modeled by a single force vector located at the midline of the bearing surface. The force vector due to motor torque applied to surface 254 is identified as "Va". The force vector due to motor torque applied to surface 252 is identified as "Vb". The force vector due to motor torque applied to surface 334 is identified as "Vc". The force vector due to motor torque applied to surface 336 is identified as "Vd". (FIG. 6) The lines of action of the forces acting on diagonally opposed surfaces are offset from each other by a distance "Da" and "Db". The offset distances "Da" and "Db" illustrated herein are equal since the elongate telescopic portion 400 is symmetrical.

Each diagonally opposed pair of bearing surfaces shown in the illustrations herein is completely offset. A plane 426 disposed between bearing surface 254 and bearing surface 334 that extends perpendicular to the bearing surfaces and hence parallel to the forces acting on the bearing surfaces does not intersect either bearing surfaces. Plane 426 is illustrated herein passing through the center of area 422 of elongate telescopic portion 400, although it need not do so. Forces therefore cannot act on any portion of the bearing surface and be directly opposed along the same axis by a force applied to the diagonally opposed bearing surface. All the forces applied to diagonally opposing bearing surfaces generate a torque resisting the torque generated by motor 162. A force applied to any portion of the bearing surfaces 254, 334 generates a torque. The same would be true about the other diagonally opposed pair of bearing surfaces 252, 336 due to the symmetry of the elongate telescopic portion 400 about a vertical axis and a horizontal axis. Thus the elongate telescopic portion 400 can resist torques applied when it accelerates in the forward direction and in the reverse direction.

To further equalize wear on the four bearing surfaces 252, 254, 334, 336 of the elongate telescopic portion 400, the bearing surfaces are distributed about the steering axis 414 defined by the steering knuckle mounts 176, 178 such that two of the bearing surfaces (254, 336) are disposed forward of the steering axis in the direction of travel, and the other two bearing surfaces (252, 334) are disposed behind the steering axis in the direction of travel. This makes the load applied to each bearing surface more equal and therefore tends to equalize the wear on the bearing surfaces and also on the V-shaped bearings that support the bearing surfaces.

Vertical member 404 is fixed to and formed integral with the outer end of elongate telescopic portion 400 such that vertical member 402 of C-frame 402 is in an abutting relation with elongate telescopic portion 400. Elongate telescopic portion 400 is hollow over substantially its entire length, and is enclosed at its outer end by vertical member 404 which is fixed across this opening. This provides superior strength as compared to axles in which the C-frame is entirely eliminated and upper and lower steering knuckle mounts are formed in the top wall and bottom wall of an elongate extendable tubular portion similar to the elongate telescopic portion 400.

The invention claimed is:

1. An extendible axle member (146, 148) for an agricultural harvester (100), the harvester having a chassis (107) supported on two driven front wheels (120) and two driven and steerable rear wheels (124), the rear wheels (124) being supported on a rear axle assembly (128) that includes a central axle member (136) supported to pivot about a horizontal and longitudinally extending axis (138), the central axle member (136) including left side and right side outer axle members (142, 144), the extendible axle member (146, 148) comprising:

an elongate telescopic portion (400) having a longitudinal axis parallel to the longitudinal extent of the elongate telescopic portion (400), the elongate telescopic portion (400) further having a plurality of bearing surfaces (252, 254, 334, 336), the elongate telescopic portion (400) having a first end and a second end, wherein the first end is configured to be slidably received inside a first open end (410) of the left or right side outer axle member (142, 144) and to be telescopically supported on bearing surfaces (248, 250, 322, 324) disposed inside the left or right side outer axle member (142, 144);

a C-frame (402), comprising a vertical member (404) to which the elongate telescopic portion (400) is fixed, the vertical member (404) having an upper end and a bottom end, a first horizontal member (406) fixed to and extending horizontally from the upper end, and a second horizontal member (408) fixed to and extending horizontally from the bottom end, the two horizontal members (406, 408) defining upper and lower steering knuckle mounts (178, 176), wherein the C-frame (402) and the elongate telescopic portion (400) are formed integral with each other and abut each other; and wherein the elongate telescopic portion is generally rectangular in shape, the rectangle being defined by a vertically oriented front wall, a vertically oriented rear wall, a horizontally oriented top wall and a horizontally oriented bottom wall, and wherein each of the plurality of bearing surfaces is disposed at respective corners of the elongate telescopic portion and said each of the plurality of bearing surfaces is spaced apart from the other bearing surfaces of the plurality of bearing surfaces, and further wherein diagonally opposed bearing surfaces of said plurality of bearing surfaces are disposed with respect to each other such that lines of action of the forces acting on said diagonally opposed surfaces are offset from each other.

2. The extendible axle member (146 or 148) of claim 1, wherein the plurality of bearing surfaces (252, 254, 334, 336) are planar and include two upper (252, 254) and two lower bearing surfaces (334, 336), wherein the two upper bearing surfaces (252, 254) face upward and outward away from each other, and the two lower bearing surfaces (334, 336) face downward and outward away from each other.

3. The extendible axle member (146 or 148) of claim 1, wherein the elongate telescopic portion (400) is in the form of a hollow tube having an open outer end, wherein said outer end is enclosed by the vertical member (404).

4. The extendible axle member (146 or 148) of claim 3, wherein the vertical member (404) is disposed generally perpendicular to the longitudinal extent of the elongate telescopic portion (400).

5. The extendible axle member (146 or 148) of claim 3, wherein at least a portion of the vertical member (404) is higher than a topmost portion of the elongate telescopic portion (400) when the elongate telescopic portion (400) is in its operating position.

6. The extendible axle member (146 or 148) of claim 3, wherein the elongate telescopic portion (400) is fixed to the vertical member (404) such that a center of area (422) of the elongate telescopic portion (400) is below the vertical midline (424) of the vertical member (404).

7. The extendible axle member (146 or 148) of claim 3, wherein at least a portion of the vertical member (404) is lower than the bottommost portion of the elongate telescopic portion (400) when the elongate telescopic portion (400) is in its operating position.

8. The extendible axle member (146 or 148) of claim 3, wherein at least a portion of the vertical member (404) is disposed directly above the outer axle member when the elongate telescopic portion (400) is fully inserted inside the left or right side outer axle member (142, 144).

9. The extendible axle member (146 or 148) of claim 3, wherein every one of the four bearing surfaces (252, 254, 334, 336) is disposed at either a 90 degree angle or a 180 degree angle with respect to all the other bearing surfaces (252, 254, 334, 336).

10. The extendible axle member (146 or 148) of claim 3, wherein the vertical member (404) abuts the plurality of bearing surfaces (252, 254, 334, 336).

11. The extendible axle member (146 or 148) of claim 1, wherein the first and second horizontal members (406, 408) extend from the vertical member (404) on a side of the vertical member (404) opposite the side from which the elongate telescopic portion (400) extends.

12. The extendible axle member of claim 1, wherein two (254, 336) of the plurality of bearing surfaces (252, 254, 334, 336) are disposed forward of a steering axis (414) defined by the steering knuckle mounts (178, 176) and two others (252, 334) of the plurality of bearing surfaces (252, 254, 334, 336) are disposed behind the steering axis (414).

* * * * *